March 17, 1931.     C. CARLONI     1,796,560
OUTLET COCK
Filed April 5, 1928
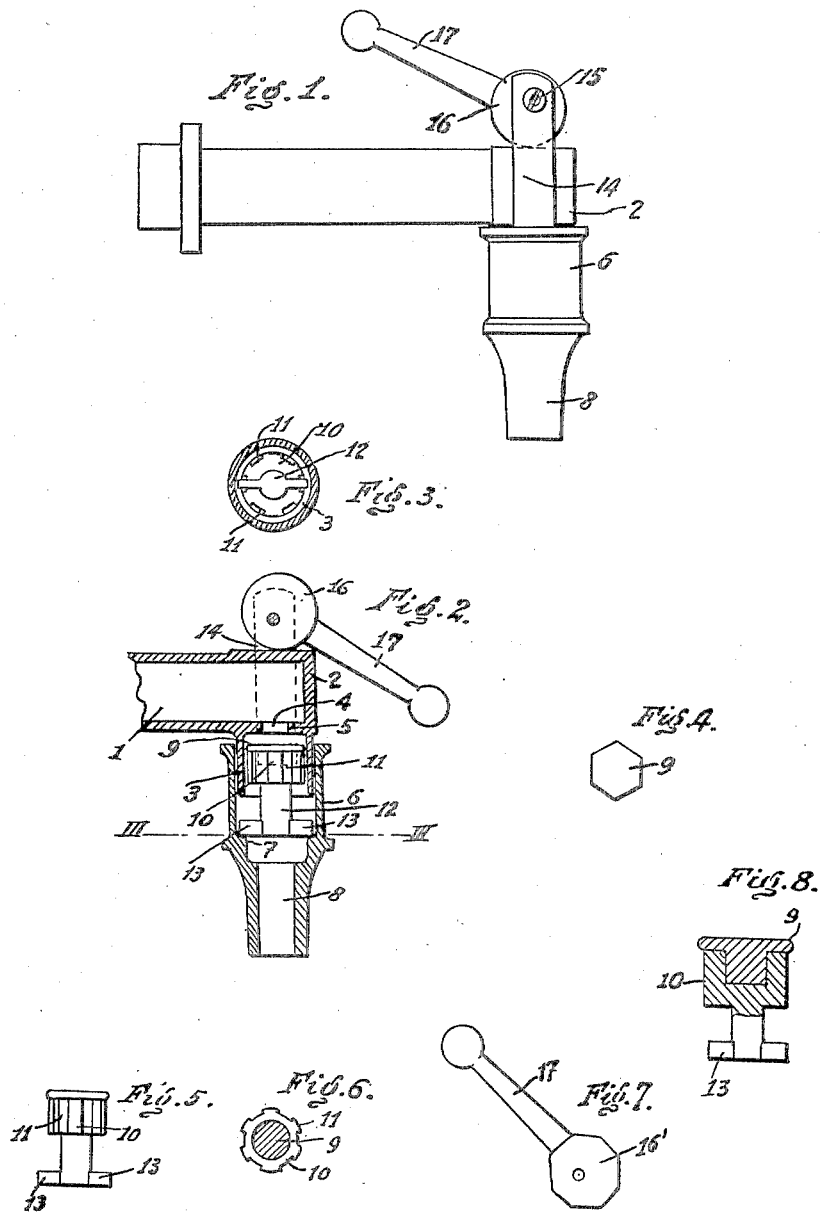

Patented Mar. 17, 1931

1,796,560

UNITED STATES PATENT OFFICE

CARLO CARLONI, OF MILAN, ITALY

OUTLET COCK

Application filed April 5, 1928, Serial No. 267,729, and in Italy May 18, 1927.

Outlet cocks are already known in which the outlet shank of the cock is screwed into a downwardly directed extension of the practically horizontal inlet shank, so that the opening and closing of the cock is done by turning the outlet shank in one or the opposite direction. This arrangement involves the following inconveniences that show themselves after a relatively short working period and are common to all screw types of cocks.

1.—The original packing and the closing member get out of order, owing to the hard pressure put upon them on closing the cock.

2.—The screw threads are liable to rapid wear.

The object of the present invention is to remove the said inconveniences and to provide a cock the outlet shank of which is slidably, instead of rotatably, fitted on a tubular extension of the horizontal shank connected to the supply piping, and the closing and opening is done by sliding the said outlet shank in one or the opposite direction.

This sliding of the outlet shank in the two directions is operated by an eccentric device provided between the upper ends of upwardly directed extensions secured to the outlet shank and bearing at a convenient point on the inlet shank.

Owing to the fact that the cock is provided with means for limiting the maximum sliding stroke by which the closing member is brought into closing position, the possibility will be avoided that the users may exert an excessive effort on the packing or on the closing member; these parts will therefore last longer, inasmuch as they will not be subjected to unduly high stresses and compressions during the closing operation.

When the control member is moved from the closing to the opening position, the pressure of the liquid acting on the packing and on the closing member causes the outlet shank to slide in opening direction.

The cock further comprises a closing member which, owing to its form, even if the outlet shank is fitted on the extension of the horizontal shank with a certain clearance, prevents the liquid from flowing back through the clearance left between the inlet and the outlet shank.

In the accompanying drawing the invention is illustrated in its preferred form which is intended as an example only.

Fig. 1 shows a side view.

Fig. 2 is a similar view to that of Fig. 1, partly in section along a vertical-longitudinal plane.

Fig. 3 is a section through III—III in Fig. 2

Figs. 4, 5, 6 are detail figures.

Fig. 7 shows a modified form of a detail.

Fig. 8 is a sectional detail of the closing device.

With reference to Figs. 1 to 6, the tubular inlet shank or attaching inlet-portion 1 adapted to be screwed in the usual way on the supply piping, terminates with a hollow head 2 of parallelopiped form; the under side of the head 2 has an aperture 4 and has a lateral tubular extension 3 pointing downwardly and forming a tubular or cylindrical chamber, this chamber being open at the bottom and having an annular flange 5 at the top surrounding the aperture.

On the cylindrical extension 3 a cylindrical sleeve or outlet shank 6 is slid with a slight play between the two, the bore of this sleeve decreasing in diameter in downward direction so as to form first a shoulder 7 and then the outlet shank 8 of the cock.

In the chamber formed by the tubular extension 3, a packing disc 9 (Figs. 2 and 4) is arranged; this packing disc is made of convenient thickness and polygonal in shape, for instance hexagonal as shown in Fig. 4, and such that the circumscribed circle has a diameter equal to or slightly less than the inside diameter of the said chamber. The polygon sides may be rectilinear, or curvilinear or any other desired shape, provided the central portion of the disc be unapertured, this portion being slightly larger than the opening 4, which it must cover when the cock is closed. The packing disc 9 may be made of any suitable material; in practice it has been found that Pará rubber gives the best results inasmuch as it possesses such a durability and elasticity as are hardly to be found in other materials. Eventually, as shown in Fig. 6, the packing disc 9 may be lodged in a recess formed in the top face of the cylindrical block 10.

In the above said chamber a cylindrical block 10 is arranged, the block being provided with longitudinal slots 11 on its periphery. The upper face of the block is plane and the packing disc 9 may be secured thereto in any desired manner. The height of the block 10 is small and somewhat less than the length of the tubular chamber 3. From the underside of the block an axial stem 12 extends downwardly, this stem being smaller in diameter or section than the block (Figs. 2 and 5). At its bottom end the stem 12 has two diametrally opposite extensions 13—13, with which it forms an inverted T. The extensions 13—13 are intended to rest on the shoulder 7 formed in the sleeve 6.

From two diametrally opposite points of the top end of the sleeve 6 two flat extensions or strips 14—14 are directed upwardly and slidably embrace two opposite sides of the parallelopiped head 2 of the inlet shank of the cock. The two flat extensions or strips 14 project past the upper side of the head 2 and have each a hole for reception of a spindle 15. Between the top ends of the strips 14 a cylinder (or disc) 16 is arranged; the cylinder (or disc) has a longitudinal eccentric bore for reception of the spindle 15, which latter may be fixed to the strips 14 in any desired manner. The cylinder (or disc) constitutes an eccentric, the periphery of which always rests on the top side of the parallelopiped head 2 of the cock inlet shank 1. A handle 17, connected to the cylinder (or disc) serves to revolve the cylinder (or disc) about the spindle 15.

When the eccentric is brought into the position shown in Fig. 2 the complete opening of the cock is effected. With this position, the pressure obtaining in the supply piping acts, across the aperture 4, on the packing disc 9. As the packing disc 9 is in contact with the block 10, and the side extensions 13 of the block stem 12 rest on the shoulder 7 of the sleeve 6, the pressure of the liquid will force all these parts downwardly, the weight of the parts themselves assisting in bringing about this downward movement. The aperture 4 is therefore opened. The water (or other liquid or fluid) will get into the chamber of the tubular extension 3 and, passing through the slots and passages along the sides of the packing disc 9 and block 10, will enter the bore of the sleeve 6.

The arrangement and form of the block 10 and of the extensions 13 of the block stem 12 are such that they do not hinder the progress of the liquid or fluid on its way to the cock outlet shank 8; all back flow of the liquid or fluid in upward direction through the slight clearance left between the sleeve 6 and the tubular extension 3 is thus prevented.

When the eccentric 16 is brought into the position shown on Fig. 1, the cock will be closed, since the sleeve will be drawn upwardly along with the block 10, and the block will force the packing disc 9 against the seat around the aperture 4 and thus close it. The arrangement and method of securing the handle 17 to the eccentric 16 may be varied.

When the eccentric 16 is brought into an intermediate position between the two positions aforementioned, a regulation of the liquid or fluid delivery will be obtained. The peripheral surface of the eccentric 16 may be made to consist of a plurality of narrow, flat (for instance as shown in Fig. 7) in order that the eccentric (cylinder or disc) may automatically remain in the desired positions corresponding to the desired intermediate outputs of the cock.

Of course the constructive details and the form details may vary in practice from those shown and described.

Having now particularly described and ascertained the nature of my said invention and in what manner the same is to be performed, I declare that what I claim is:—

1. An outlet cock comprising an attaching inlet portion having a lateral outlet extension provided with a valve seat, an outlet shank arranged in telescopic engagement with the extension, cooperative guiding means on the attaching portion and the outlet shank, a valve mounted within the outlet shank, and a device operably connected with the guiding means on the shank and coacting with the attaching portion so that when moved in one direction the outlet shank and the valve are moved into closed position whereas when moved in an opposite direction the pressure of the liquid automatically acts to move the valve into open position.

2. An outlet cock comprising an attaching inlet portion adapted to be connected with a supply pipe and having an outlet extension, an outlet shank adapted to slide along but not revolve about its own axis and mounted on the extension, a closing device supported on the inside of the outlet shank, flat extensions projecting from the shank and arranged in slidable relation with the attaching portion, and a device mounted on the extensions and coacting with the attaching portion which when moved in one direction brings the outlet shank and closing device into closing position whereas when it is moved in an opposite direction permits the pressure of the liquid to act on the closing device and outlet shank to effect the automatic opening of the device.

3. An outlet cock comprising an attaching inlet portion adapted to be connected with a supply pipe and having an outlet extension and provided with a valve seat, the opposing faces of the outer end of the attaching portion being flat, an outlet shank arranged in telescopic relation with the extension, flat extensions projecting upwardly from opposite sides of the outlet shank and in sliding engagement with the opposed flat faces of the attaching portion, a disc eccentrically supported at the upper end of the extensions and provided with an operating handle, a cylindrical spindle secured in the upper ends of said flat extensions for supporting the disc so that it can revolve eccentrically, a short cylindrical valve block in said extension for coacting with the valve seat and having longitudinal slots formed on its periphery, a reduced stem projecting from the block and having lateral extensions supported within the shank, a packing disc lodged in the top face of the block for effecting a tight closure with respect to the valve seat when forced thereagainst, substantially as and for the purposes set forth.

4. An outlet cock as claimed in claim 3, wherein the peripheral surface of the eccentric disc is composed of a plurality of narrow adjacent faces.

5. An outlet cock as claimed in claim 3, wherein the top of the face of the block is provided with a recess for accommodating the packing disc.

6. An outlet cock comprising an attaching inlet portion adapted to be connected with a supply pipe and having an outlet extension provided with a valve seat, an outlet shank telescopically arranged about the extension and provided with an internal annular shoulder, a valve device supported on the shoulder and positioned within the extension for coacting with the seat, guiding members projecting upwardly from the shank and coacting with the attaching portion to prevent turning of the shank, and a manually operably member eccentrically mounted in the upper ends of the guiding members and coacting with the upper surface of the attaching portion for regulating the opening and closing of the valve member.

7. An outlet cock as claimed in claim 6, wherein the top of the valve is provided with a recess, and a packing disc seated in the recess for coacting with the valve seat.

Signed at Milan (Italy), this 23rd day of March, 1928.

CARLO CARLONI.